(12) United States Patent
Li

(10) Patent No.: US 12,482,038 B2
(45) Date of Patent: Nov. 25, 2025

(54) METHOD AND APPARATUS FOR CREATING QUANTITATIVE TRADING STRATEGY

(71) Applicant: FUTU NETWORK TECHNOLOGY (SHENZHEN) CO., LTD., Guangdong (CN)

(72) Inventor: Jian Li, Guangdong (CN)

(73) Assignee: FUTU NETWORK TECHNOLOGY (SHENZHEN) CO., LTD., Guangdong (CN)

( * ) Notice: Subject to any disclaimer, the term of this patent is extended or adjusted under 35 U.S.C. 154(b) by 172 days.

(21) Appl. No.: 17/896,092

(22) Filed: Aug. 26, 2022

(65) Prior Publication Data

US 2023/0101521 A1   Mar. 30, 2023

Related U.S. Application Data

(63) Continuation of application No. PCT/CN2021/120466, filed on Sep. 24, 2021.

(51) Int. Cl.
G06Q 40/04 (2012.01)

(52) U.S. Cl.
CPC .......... *G06Q 40/04* (2013.01); *G06Q 40/043* (2025.08)

(58) Field of Classification Search
CPC ....... G06Q 40/04; G06Q 40/043; G06F 9/451
See application file for complete search history.

(56) References Cited

U.S. PATENT DOCUMENTS

| | | | | |
|---|---|---|---|---|
| 2011/0072414 A1* | 3/2011 | Gardner | ................ | G06Q 40/04 |
| | | | | 717/109 |
| 2012/0191588 A1* | 7/2012 | Lidor | .................... | G06Q 40/06 |
| | | | | 705/37 |

(Continued)

FOREIGN PATENT DOCUMENTS

| | | |
|---|---|---|
| CN | 106504088 A | 3/2017 |
| CN | 107797797 A | 3/2018 |

(Continued)

OTHER PUBLICATIONS

"The Authoritative Dictionary of IEEE Standards Terms, Seventh Edition," in IEEE Std 100-2000 , vol. no., pp. 1-1362, Dec. 11, 2000 , doi: 10.1109/IEEESTD.2000.322230. (Year: 2000).*

(Continued)

*Primary Examiner* — Bennett M Sigmond
*Assistant Examiner* — Bolko M Hamerski

(57) ABSTRACT

Provided are a method and apparatus for creating a quantitative trading strategy. The method includes: displaying a graphical interface, which includes at least one editable control; obtaining a graphical quantitative trading strategy inputted by a user via the graphical interface, where the graphical quantitative trading strategy includes at least two edited controls and a connection line configured to connect the at least two edited controls, and each edited control includes an attribute parameter; obtaining a script of the quantitative trading strategy based on the graphical quantitative trading strategy; and running the script of the quantitative trading strategy to obtain a quantitative trading result. The user can edit a desired graphical quantitative trading strategy based on various needs via the graphical interface, without requiring the capability of writing program codes, to create a quantitative trading strategy in a simple and flexible way to meet the user's needs.

15 Claims, 10 Drawing Sheets

(56) References Cited

U.S. PATENT DOCUMENTS

| | | | | |
|---|---|---|---|---|
| 2012/0259762 | A1* | 10/2012 | Tarighat | G06F 8/34 |
| | | | | 705/37 |
| 2014/0297503 | A1* | 10/2014 | Murphy | G06Q 40/00 |
| | | | | 705/37 |
| 2015/0235318 | A1* | 8/2015 | Huan | G06Q 40/04 |
| | | | | 705/37 |
| 2016/0275607 | A1* | 9/2016 | Singer | G06Q 40/04 |
| 2017/0300304 | A1* | 10/2017 | Weil Shlomo | G06F 8/31 |
| 2021/0286644 | A1* | 9/2021 | Jingoi | G06F 16/2246 |

FOREIGN PATENT DOCUMENTS

| | | | |
|---|---|---|---|
| CN | 108984167 | A | 12/2018 |
| CN | 110503556 | A | 11/2019 |
| CN | 110688106 | A | 1/2020 |
| CN | 111930373 | A | 11/2020 |
| JP | 2008129984 | A | 6/2008 |
| JP | 2014515143 | A | 6/2014 |
| WO | WO-2016140653 A1 * | 9/2016 | G06F 9/451 |

OTHER PUBLICATIONS

C.-H. Chou and A. Y. Chang, "Visual Development Platform for White-Box Algorithmic Trading," 2010 Sixth International Conference on Intelligent Information Hiding and Multimedia Signal Processing, Darmstadt, Germany, 2010, pp. 712-715, doi: 10.1109/IIHMSP.2010.180. (Year: 2010).*

First Office Action dated Aug. 15, 2023 received in corresponding patent family application No. AU2021427873.

First Office Action dated Nov. 14, 2023 received in corresponding patent family application No. JP2022-559690. English translation attached.

International Search Report and Written Opinion dated Jun. 22, 2022 in International Application No. PCT/CN2021/120466.

First Office Action dated Aug. 29, 2024 received in corresponding patent family application No. CN202180010866.9. English translation attached.

* cited by examiner

Fig. 4A

| Attribute | | |
|---|---|---|
| Variable 1 | Global variable | Condition variable |
| | MACD ⌄ | |
| Target | Signal target ⌄ | |
| K line period | Daily K ⌄ | |
| Short period | Please input | |
| Long period | Please input | |
| Average moving period | Please input | |
| Judgement | Yes ⌄ | |
| Variable 2 | High gold cross ⌄ | |
| Remark | Please input | |

Fig. 4B

| Attribute | | | |
|---|---|---|---|
| Variable 1 | Global variable | Condition variable | |
| | Maximum buyable ⌄ | | |
| Price | Please input number | | |
| Type of order | Market order ⌄ | | |
| Judgement | > ⌄ | | |
| Variable 2 | Condition variable | Input manually | Global variable |
| | Please select ⌄ | | |
| Remark | Please input | | |

METHOD AND APPARATUS FOR CREATING QUANTITATIVE TRADING STRATEGY

CROSS-REFERENCE TO RELATED APPLICATIONS

This application is a continuation of International Application No. PCT/CN2021/120466, filed on Sep. 24, 2021, which is hereby incorporated by reference in entirety.

FIELD

Embodiments of the present disclosure relate to the field of a software technology, and more specifically, to a method for creating a quantitative trading strategy and an apparatus for creating a quantitative trading strategy.

BACKGROUND

The quantitative trading strategy is widely applied to in financial markets. The quantitative trading strategy can directly affect the loss of interest to an investment user or team. Therefore, it is particularly important to create a quantitative trading strategy.

The user, when creating a quantitative trading strategy, often writes codes in a programming language to achieve quantitative analysis of data. Accordingly, the user shall have the ability of writing program codes, for example, understanding complex concepts such as variables, functions, classes, and TCP connections in programming, and reading burdensome API documentations, which requires high professional capability. In addition, it is also possible that the user is guided to create a quantitative trading strategy through a strategy-oriented approach, for example, by providing the user with a fixed rule interface, enable the user to create the quantitative trading strategy through, for example, ticking. However, this approach is difficult to meet the user's personalized requirements.

Therefore, it is desirable to create a quantitative trading strategy in a simple and flexible way to meet the user's requirements.

SUMMARY

The embodiments of the present disclosure provide a method for creating a quantitative strategy and an apparatus for creating a quantitative trading strategy, which can create a quantitative trading strategy in a simple and flexible way to meet the user's needs.

In a first aspect, a method for creating a quantitative trading strategy is provided. The method includes: displaying a graphical interface, where the graphical interface includes at least one editable control; obtaining a graphical quantitative trading strategy inputted by a user via the graphical interface, where the graphical quantitative trading strategy includes at least two edited controls and a connection line configured to connect the at least two edited controls, and each of the at least two edited controls includes an attribute parameter; obtaining a script of the quantitative trading strategy based on the graphical quantitative trading strategy; and running the script of the quantitative trading strategy to obtain a quantitative trading result.

In a second aspect, an apparatus for creating a quantitative trading strategy is provided. The apparatus includes: a display unit configured to display a graphical interface, where the graphical interface includes at least one editable control; an obtaining unit configured to obtain a graphical quantitative trading strategy inputted by a user via the graphical interface, where the graphical quantitative trading strategy includes at least two edited controls and a connection line configured to connect the at least two edited controls, and each of the at least two edited controls includes an attribute parameter; a processing unit configured to obtain a script of the quantitative trading strategy based on the graphical quantitative trading strategy and run the script of the quantitative trading strategy to obtain a quantitative trading result.

In a third aspect, an electronic device is provided. The electronic device includes a processor, and a memory having a computer program stored thereon. The processor is configured to call and run the computer program stored in the memory to implement the method according to the first aspect.

In a fourth aspect, provided is a computer-readable storage medium having a computer program stored thereon, and the computer program causes a computer to implement the methods according to the first aspect and any implementation according to the first aspect.

In a fifth aspect, a computer program product is provided. The computer program product includes computer program instructions, which cause a computer to implement the methods according to the first aspect and any implementation in the first aspect.

In a sixth aspect, a computer program is provided. The computer program, when executed by a computer, causes the computer to implement the methods in the first aspect and any implementation in the first aspect.

In the embodiments of the present disclosure, a graphical quantitative trading strategy is obtained inputted by a user via a graphical interface, the graphical quantitative trading strategy is compiled to obtain a script of a quantitative trading strategy, and the script of the strategy is run to obtain a quantitative trading result. In the present disclosure, the user can edit a desired graphical quantitative trading strategy based on various needs via the graphical interface, without the ability of writing program codes, so that the present disclosure can achieve creating a quantitative trading strategy in a simple and flexible way to meet the user's needs.

BRIEF DESCRIPTION OF DRAWINGS

FIG. 4A is a specific example of an attribute bar corresponding to a condition box according to an embodiment in the present disclosure, in which a condition variable for the variable 1 area is MACD. FIG. 4B is a specific example of an attribute bar corresponding to a condition box according to another embodiment in the present disclosure, in which a condition variable for the variable 1 area is a maximum buyable.

DESCRIPTION OF EMBODIMENTS

Technical solutions of embodiments of the present disclosure are described below in conjunction with the drawings of the present disclosure. The described embodiments are some embodiments of the present disclosure, but not all the embodiments of the present disclosure. For the embodiments in the present disclosure, all other embodiments obtained by those skilled in the art without paying creative efforts shall fall within the scope of the present disclosure.

It should be understood that, in the embodiments of the present disclosure, "B corresponding to A" means that B is associated with A. In one implementation, B may be determined based on A. However, it should be understood that, B may be determined based on A does not mean that B is determined solely based on A, but may be determined based on A and/or other information.

In the specification, "at least one" means one or more, and "a plurality of" means two or more; unless otherwise stated. In addition, "and/or" describes the association relation of associated objects, indicating three possible relations. For example, A and/or B indicates that only A exists, both A and B exist, only B exists, where A, B may be singular or plural. The character "/" generally indicates that the associated objects connected by the character have an "or" relation. "At least one of . . . " or similar expression refers to any combination of the mentioned items, i.e., one of them or any combination of multiple items. For example, at least one of a, b, or c may refer to: a; b; c; a and b; a and c; b and c; or a and b and c, where a, b, c may be an individual item or a plurality of items.

It should be understood that the expressions such as "first" and "second" that appears in the embodiments of the present disclosure are only for the purpose of indicating and distinguishing the described Objects without limiting the order, instead of indicating the special limitations on the number of devices in the embodiments of the present disclosure or constituting any limitation on the embodiments of the present disclosure.

It should be understood that the specific features, structures or characteristics in the specification involving the embodiments are included in at least one embodiment of the present disclosure. In addition, these specific features, structures, or characteristics may be combined in one or more embodiments in any appropriate way.

In addition, the terms "include", "have" and any variations thereof are non-exclusive inclusions. For example, processes, methods, systems, products, or servers that includes a series of steps or units may include other steps or units that are not clearly listed or inherent in those processes, methods, products, or devices, without being limited to those steps or units clearly listed.

Figure 1:
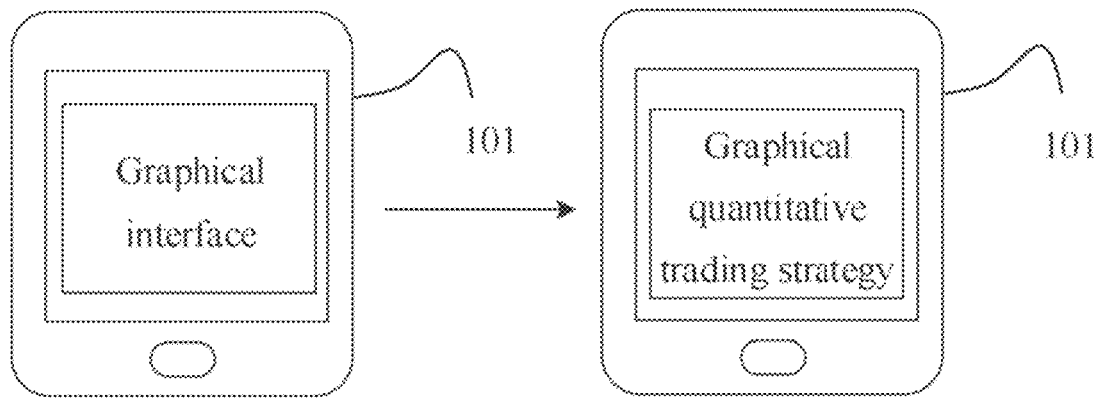
FIG. 1 is a schematic diagram of an application scenario applied in the embodiments of the present disclosure application.

FIG. 1 is a schematic diagram of an application scenario according to an embodiment of the present disclosure. The application scenario involves an electronic device 101. The electronic device 101 may be various kinds of terminal devices, for example, a smartphone (such as an Android phone, an iOS phone, a Windows phone, etc.), a tablets, a handheld, a laptop, a mobile Internet device, a wearable device, a vehicle mounted device, etc., which is not limited herein. The terminal device can also be referred to as a user equipment (UE), a terminal, or a user device, etc., which is not limited herein.

Optionally, the electronic device 101 can transmit data with a server (e.g., a market server) by means of wireless communication technology. For example, as illustrated in FIG. 1, the electronic device 101 may be in a client/server (C/S) mode, and the client can pull data from a server side (such as the server). As a specific example, the client can adopt a Model-View-Presenter (MVP) architecture to separate interfaces, data operations, data warehouses, and so on.

In the embodiments of the present disclosure, for example, the electronic device may display a graphical interface including at least one editable control, and the user may input a graphical quantitative trading strategy by operating the electronic device 101. The graphical quantitative trading strategy includes at least two edited controls and a connection line. In response to the operation of the user, the electronic device 101 obtains the graphical quantitative trading strategy and a script of the quantitative trading strategy, and runs the script to obtain a quantitative trading result.

For example, a target of the quantitative trading in the embodiment of the present disclosure may be future goods, stocks, funds, or other products, which is not limited herein.

It should be noted that the application scenario illustrated in FIG. 1 is merely for illustration purpose, rather than limiting the embodiments of the present disclosure. In the specific implementation, the technical solution according to the embodiment of the present disclosure may be applied flexibly based on the actual needs.

Figure 2:
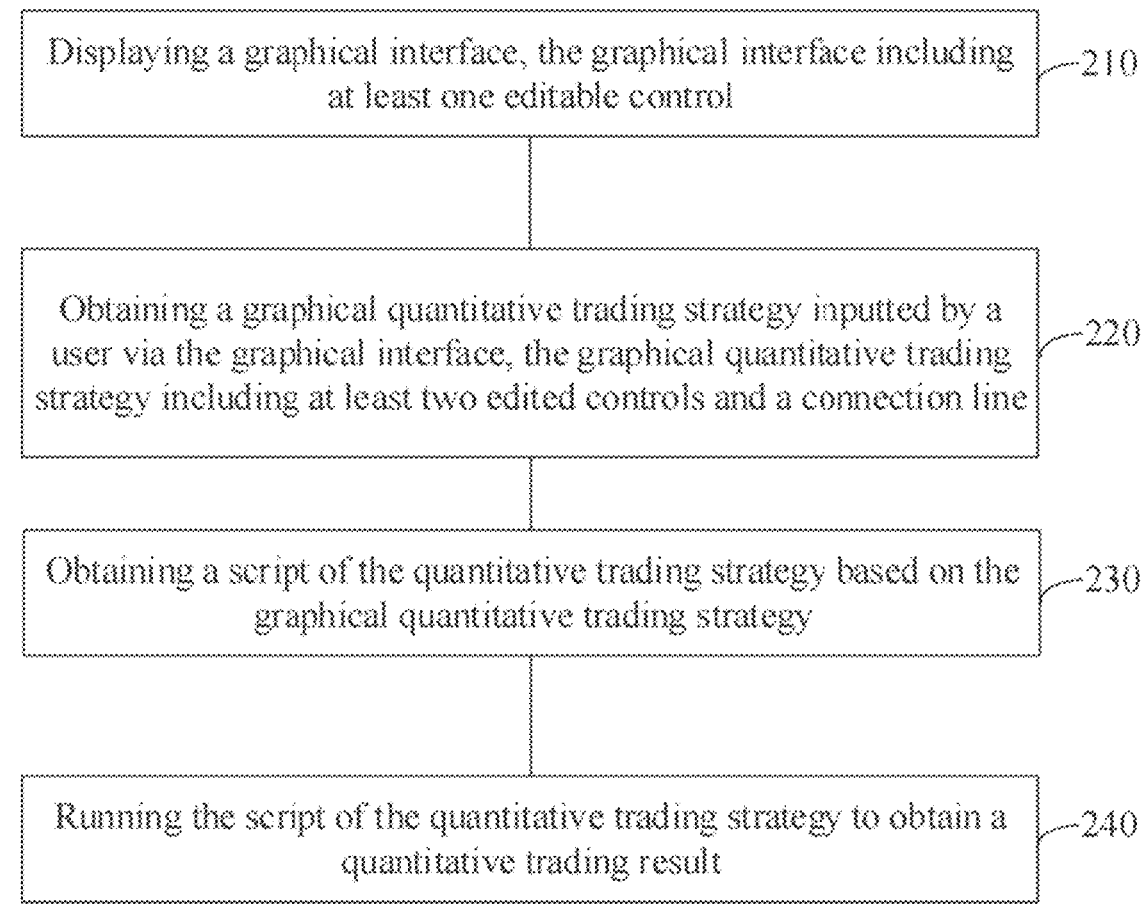
FIG. 2 is a schematic flowchart of a method for creating a quantitative trading strategy according to an embodiment in the present disclosure.

FIG. 2 illustrates a schematic flowchart of a method 200 for creating a quantitative trading strategy according to an embodiment of the present disclosure. The method 200 may be implemented by the electronic device 101 illustrated in FIG. 1 or by a circuit or a chip disposed in the electronic device 101. As illustrated in FIG. 2, the method 200 includes steps 210 to 240.

At step 210, a graphical interface is displayed, where the graphical interface includes at least one editable control.

For example, the graphical interface is displayed on an interface of an application (APP) installed in a terminal device, enabling the user to create a quantitative trading strategy. The APP may be a desktop APP, or a cellphone APP, which is not limited herein.

Here, the control may be a graphical control. Specifically, in the embodiment of the present disclosure, the quantitative trading strategy may be abstracted into graphical controls. For example, the control may include at least one of a start control, a condition control, and an event control. The respective controls in the graphical interface are editable, and the user can input an attribute parameter of the control by editing.

At step 220, a graphical quantitative trading strategy inputted by a user via the graphical interface is obtained, where the graphical quantitative trading strategy includes at least two edited controls and a connection line configured to connect the at least two edited controls, and the edited control includes an attribute parameter.

For example, the user can divide the quantitative trading strategy process into different conditions or events, then select controls (such as at least one of the start control, the condition control, and the event control) via a graphical interface, edit the control to input the attribute parameter of the selected control, and then connect at least two controls through the connection line in series or parallel, thereby achieving a variety of quantitative trading strategies, Here, the connection line may refer to an association relation between the at least two controls that are connected.

In some optional embodiments, the graphical interface includes a control bar, a strategy canvas, and an attribute bar. As an implementation of obtaining the graphical quantitative trading strategy inputted by the user via the graphical interface, at least one control selected by the user in the control bar may be obtained. Then, in response to a first operation of the user, the at least one control is added to the strategy canvas, where the start control is pre-set in the strategy canvas. Then, a control selected by the user in the strategy canvas may be obtained, and the attribute parameter of the selected control is editable in the attribute bar. Then, in response to a second operation of the user, the at least one control and the start control are connected through the connection line to generate the graphical quantitative trading strategy.

The process of creating the graphical quantitative trading strategy is described in detail below in conjunction with a display interface of an APP. It should be understood that the various diagrams illustrating the interface in the following embodiments are intended only to facilitate the understanding of the technical solutions according to the embodiments of the present disclosure, rather than constituting limitations on the technical solutions of the present disclosure.

Figure 3:
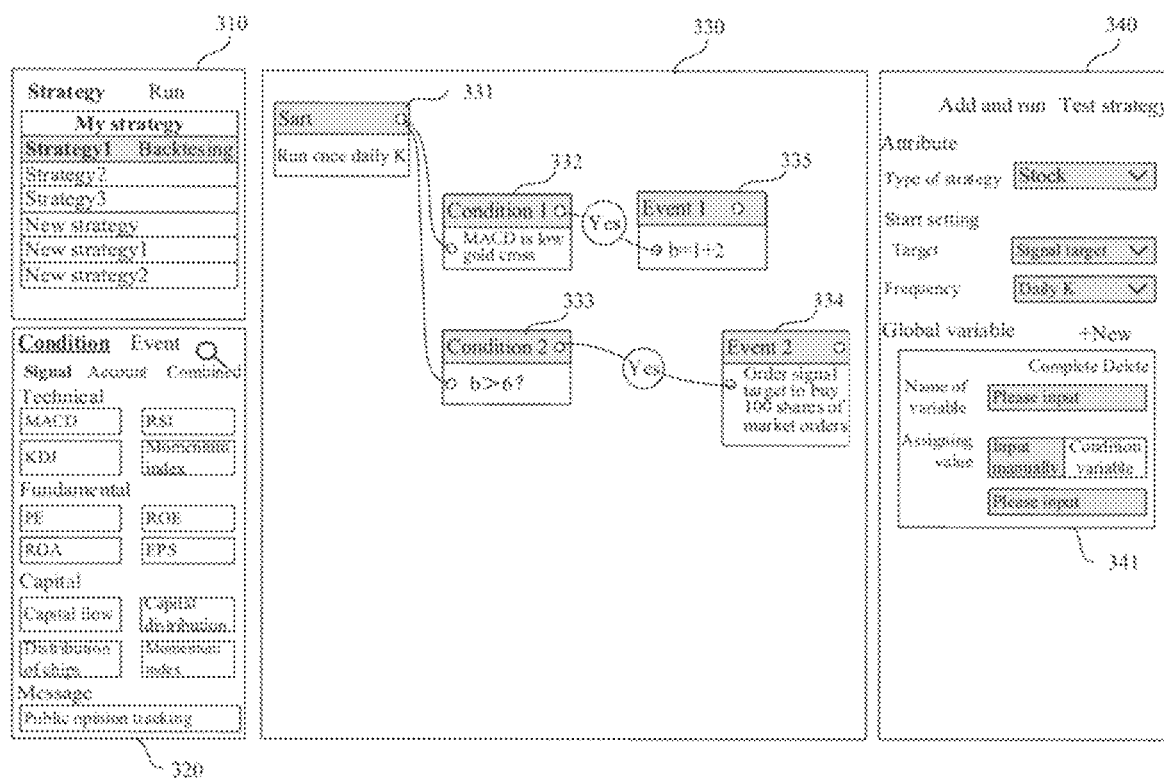
FIG. 3 is a specific example of a graphical interface according to an embodiment in the present disclosure.

FIG. 3 illustrates a specific example of a graphical interface, which includes a navigation bar 310, a control bar 320, a strategy canvas 330, and an attribute Tar 340.

As illustrated in FIG. 3, the navigation bar 310 can display a current quantitative trading strategy (e.g., strategy 1, strategy 2, strategy 3, new strategy, new strategy 1, new strategy 2 in FIG. 3, etc.), or a running quantitative trading strategy. Optionally, the navigation bar 310 can display a status of the quantitative trading strategy, such as be backtesting. Optionally, the navigation bar can display an icon for creating a new quantitative trading strategy, such as "+".

Further referring to FIG. 3, the control bar 320 is configured to display a plurality of editable controls, such as a condition control and an event control. A condition control library is configured to store judgement conditions, and an event control library is configured to store events of performing an operation. One or more conditions may correspond to one condition control, and one or more events may correspond to one event control, which are not limited herein.

For example, the condition control can, for example, be a group of logical judgements, such as if/else logical judgement. The user can choose different judgement conditions on his/her own, for example, "Is a moving average a long order?", or "Is the maximum number available for purchase greater than 1?" The condition control can determine whether a selected account holds a position or not, or determine whether an unfinished order condition exists, and so on.

For example, the event control may be an execution function, for example, buying 1 board lot of a stock at a seller's price, or cancellation of the entire account. It seems like a simple logic, but requires internal handling of exceptions as well as global interval management to prevent the centralized concurrent requests on the server.

In some optional embodiments, the condition control includes at least one of a signal control, an account control, and a combination control.

Specifically, the signal is objective data related to the market. Optionally, based on a common trading basis of the user, a signal condition control may be divided into several categories such as technical analysis, fundamental analysis, capital analysis and message analysis. In some embodiments, a signal may be predefined and may be dragged by the user for use, such as a predefined result of MACD is "a golden cross", "a dead cross", "a top divergence", "a bottom divergence" and so on. The control bar 320 in FIG. 3 illustrates a specific example of a signal control. For example, the technical analysis may include condition controls such as a moving averages convergence and divergence (MACD), a stochastic indicator (KDJ), a relative strength index (RSI), a momentum index. The fundamental analysis may include condition controls such as price to earning ratio (PE), a return on assets (ROA), a return on equity (ROE), earnings per share (EPS). The capital analysis may include a capital flow, a capital distribution, a stock price variation, or other condition controls, and the message analysis may include a public opinion tracking condition control.

Optionally, the control bar may include a variable comparison signal for comparing a size relation between a global variable, a constant, and a numeric condition variable.

Specifically, the account condition is personalized and is related to an individual's trading business account. Optionally, according to a status of a commonly used account of the user, the account condition control may be divided into several categories such as an account asset, the maximum buyable/sellable, a holding position, an order, and a transaction. For example, an asset account may include a condition control such as a maximum purchasing power, a short selling purchasing power, a cash purchasing power, a net asset value, a risk status, cash, a long market value, a short market value, an initial margin, a margin call, a maintenance margin, etc. The maximum buyable/sellable may include a condition control such as a cash buyable, a maximum buyable, or an open position sellable. The holding position may include a position direction, the number of the holdings, quantity sellable, cost price/open price, a market value of the position, a profit/loss ratio, a profit/loss amount, a total amount for buying today (stocks only), a total value for buying today (stocks only), a total amount for selling today (stocks only), a total value for selling today (stocks only), unrealized profit/loss (futures only), realized profit/loss (futures only) and other condition control. The order may include an order status, the price of a previous long order, the price of a previous short order and other condition control, and the transaction may include a transaction status, a transaction price, the number of transactions and other condition control.

Specifically, a plurality of conditions may be packaged in one combined-condition through the logical relation of and, or, ( ) The combined-condition can correspond to a combined-condition control. The plurality of conditions may be called sub-conditions. For example, the number of the sub-conditions may be no more than 10. Optionally, the embodiments of the present disclosure support a combined-condition control defined by the user.

In some optional embodiments, the event control includes a time control such as placing an order, withdrawing an order, clearing a position, a message reminding, exiting a strategy program, and assigning an operation. Optionally, placing an order, withdrawing an order, and clearing a position may belong to a trading event control.

As an implementation, since the control may include many matters, some matters that are commonly used may be placed in the control bar, and the rest may be displayed through a pull-down menu, or may be displayed by clicking "display more", which is not limited herein.

In some embodiments, the user can search for a desired condition control or an event control, and the corresponding interface automatically jumps to the condition control or the event control.

In some optional embodiments, through a first operation, the user can select a control in the control bar 320 and add the control to the strategy canvas 330 to form a corresponding box, so as to form a graphical quantitative trading strategy. As an example of the first operation, the control may be added to the strategy canvas 330 by clicking and holding down a left mouse button and/or dragging a combined-control button. As a specific example, when a mouse hovers over a control in the control bar, the control floats which prompts the user to drag. Optionally, a color of the canvas may change accordingly to prompt the user an area where: the control may be placed. When the control is dragged fully into an area of the canvas, the control switches from a style in the original control bar to a style in the canvas, indicating that the control is in a placeable status.

Elements in the strategy canvas 330 include boxes and lines. The box may correspond to a control added by the user, or a pre-set start control. The attribute bar 340 is configured to edit an attribute for the control. When an element (such as a box or a line) in the strategy canvas 330 is selected by the user, the attribute bar 340 can display an editable parameter corresponding to the element. For example, the control may include a number of complex attributes. For example, the attribute of an order time control includes a type, a target, a direction, a price, quantity of the order, and the like. In the embodiments of the present disclosure, the attribute may be edited in the attribute bar, which can help the user understand the attribute of the control and reduce the complexity of development.

For example, each graphical quantitative trading strategy may have a start control. The start control may be generated by default when the strategy is created, i.e., the user does not need to drag the control to create it.

Further referring to FIG. 3, a default setting in the strategy canvas 330 may include displaying a box corresponding to the start control (also referred to as a start box). When the start box is selected, a parameter editing setting for the start control may be displayed in attribute bar 340. The start control may include a global attribute setting for the entire graphical quantitative trading strategy, for example, including at least one of an applicable account setting, a loop setting, and a global variable setting.

For example, due to the partial differences between different types of accounts e.g., futures accounts, securities accounts, etc.), different types of financial products or derivatives may be compatible in the same quantitative trading product by setting an applicable account parameter. A type of an account may be called a type of a strategy. When the parameter is set, the control bar automatically displays the applicable controls to avoid interfering items.

As illustrated in the attribute bar 340 in FIG. 3, the type of the strategy may be selected by pulling down a list, for example, securities, future goods, stocks, funds, etc., which is not limited herein. In some embodiments, after the type of the strategy is determined, a warning or reminder may be given if the user drags a condition that does not apply to the selected type of the strategy.

The loop setting may be set in a start setting and may include a loop setting for the entire strategy. Specifically, a loop of a script of the strategy is driven by a quote of the secondary market, and correspondingly, the user can choose to run the script of the strategy once each quote of each stock changes, or run each K line once when the market opens. As illustrated in attribute 340 in FIG. 3, the target represents a target which is referred by a loop, and the frequency represents a frequency of looping the strategy. As an example, on_bar_open( ) can represent that each Kline of the signal target runs once at the opening in a specified Kline period; on_tick( ) represents that each signal target runs once step by step, and execution only once represents that the strategy runs only once.

The global variable is configured to maintain an association between a front node and a rear node (such as controls), and data between nodes may be passed through the global variable. A setting for the global variable supports creating the global variable for selection of a parameter of a condition box and/or an event box in the canvas, for example, applied to the scenarios of assignment calculations and loop iterations. For example, as illustrated in FIG. 3, the global variable may be added, edited, deleted, and so on with corresponding buttons.

For example, when a New button is clicked in the attribute bar 340 corresponding to the start control 331, an editable global variable box 341 appears below the global variable. At this time, the global variable box may be edited, such as filling in a variable name, assigning a value. When a Complete button is clicked, the global variable is established successfully. It should be noted that when the variable name or the value assigned of the global variable is modified in the attribute of the start box, the global variable changes when the corresponding control is used later.

As an example, the value assignment may be to select a manual input or a condition variable. If the user selects the condition variable, a parameter box corresponding to the condition variable (such as a signal condition control or an account condition control) may be displayed for setting a parameter.

In some embodiments, when the parameter of the start box is edited in the attribute bar, parameter information may be displayed in the strategy canvas for the user to read. The displayed information, for example, includes at least one of a name, a target, a frequency, or otherwise, which is not limited herein. For example, in FIG. 3, the information displayed for the start box 331 is "Run daily K once", where "daily K" is frequency information.

In some embodiments, when a control is selected in the control bar 320 and added to the strategy canvas 330, a box corresponding to the control is displayed in the strategy canvas 320, such as a box corresponding to the condition control (also referred to as a condition box), a box corresponding to the event control (also referred to as an event box).

In the embodiments of the present disclosure, when the condition box is selected, a parameter editing setting of the condition control may be displayed in the attribute bar 340. For example, the condition box may have parameters in four areas for adjusting, variable 1 area, judgement area, and variable 2 area. The following illustrates a parameter setting for the condition box in conjunction with FIG. 4A and FIG. 4B.

FIG. 4A and FIG. 4B illustrate specific examples of an attribute bar corresponding to a condition box. In FIG. 4A, a condition variable for the variable 1 area is MACD, and in FIG. 4B, a condition variable for the variable 1 area is a maximum buyable. Specifically, the variable 1 area can display a parameter setting related to variable 1, the number of items in the parameter setting varies depending on different variables 1 dragged by the user. For example, as illustrated in FIG. 4A, when variable 1 is selected as MACD, parameters related to MACD will be displayed below MACD for the user to set.

For example, a judgement area may be set to be an enumeration type, for example, the user can select from a pull-down menu. Specifically, the judgement can form a corresponding pull-down enumeration tab based on the condition selected by the user. For example, as for field-type adjustments such as MACD, EMA, KW, quantity relative ratio, etc., the judgement pull-down tab may be "Yes" and "No"; and as for numeric condition such as current ratio, quick ratio, net margin, etc., the judgement pull-down tab may be ">", "<", "≥", "≤", "=", and "≠", which is not limited.

For example, the variable 2 area can vary based on changes of the variable 1. There are two scenarios:

Scenario 1: a variable 2 may be a pull-down enumeration tab when the variable 1 is an enumeration condition variable;

Scenario 2: when the variable 1 is a numeric condition variable, the variable 2 may be inputted manually; or inputted by a condition variable (for example, a numeric condition variable); or inputted by a global variable.

It should be noted that after the variable 1 or the variable 2 is selected, if there is a conflict with the type of the strategy set in the start box, a reminder of use condition may be prompted to the user, for example, prompting the user which account applies to the condition. For example, the user is prompted that the cash buyable is only applicable to securities accounts, but unapplicable to futures accounts.

For example, the name of the condition box is allowed to be modified by the user and is suitable for displaying in the canvas. For example, a box may be set with a default name. For example, the boxes may be named based on a sequence of the boxes dragged into the canvas. As a specific example, the second condition control dragged in the canvas may be named condition 2.

In some embodiments, it supports that the user remarks on the conditions. Optionally, the remark may be recorded in codes generated by the canvas to form the remark.

In some embodiments, when parameters of the condition box are edited in the attribute bar, parameter information may be displayed in the strategy canvas for the user to read. The displayed information, for example, includes at least one of a name, a variable 1, a parameter related to the variable 1, a judgement, a variable 2, a parameter related to the variable 2, etc., or otherwise, which is not limited. For example, in FIG. 3, the displayed information of the condition box 332 is "Condition 1 MACD is low gold cross", where "Condition 1" is a name, "MACD" a variable 1, "is (Yes)" is a judgment, "low gold cross" is a variable 2; and information of condition box 333 displayed is "Condition 2 b>6?", where "Condition 2" is a name, "b" is a variable 1, ">" is a judgement, and "6" is a variable 2.

In some embodiments, the user can add a combined-condition control to the strategy canvas 330. Optionally, the above method 300 further includes: displaying a popup window in response to a third operation of the user; obtaining at least two conditions (i.e., subconditions) and an association relation between the at least two conditions that are inputted by the user in the popup window; and generating the combined-condition control based on the at least two conditions and the association relation.

Figure 5:
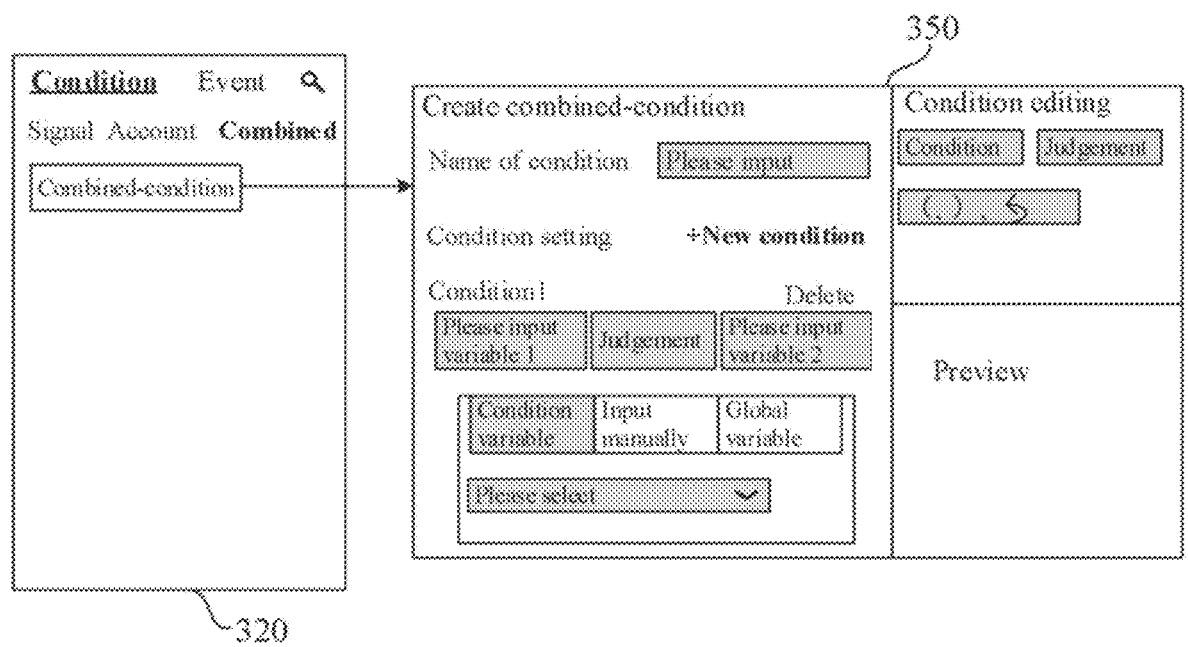
FIG. 5 is an example of an interface for editing a combined-condition in a popup window according to an embodiment in the present disclosure.

For example, a parameter editing of the combined-condition control is done in the popup window, rather than in the attribute bar. FIG. 5 illustrates an example of an interface for editing a combined-condition in a popup window. For example, the interface of the popup window may include two parts, i.e., a part for a condition setting (for example, the left part in FIG. 5) and a part for an association relation of the different conditions (the right part in FIG. 5).

As illustrated in FIG. 5, as an example of a third operation, an editing window of the popup window 350 will pop up by clicking and holding a left mouse button and/or dragging the combined-condition control button. The user can input a name for the combined-condition name. In a condition setting, when "+New condition" button is clicked, a sub-condition editing box appears, which includes, for example, a variable 1 area, a judgement area, a variable 2 area, and so on.

For example, as for the variable 1 area, there are 2 ways to input, i.e., a condition variable, and a global variable (which provides an entry to create the global variable). For example, when the condition variable is selected, the contents of a pull-down box may be all the conditions in the condition library, and a corresponding parameter box (which needs to be filled in by the user) can also be displayed. The parameter box is a parameter setting corresponding to the condition variable. When the global variable is selected, the contents of the pull-down box may be a global variable that have been set in the start box, and in this case, no parameter box is displayed.

When the user selects the condition variable and has edited a relevant parameter for a variable 1, a preview of the condition variable and its parameter may be displayed in the variable 1. When the user selects a global variable, the preview is a name of the global variable.

For example, the judgement area and the variable 2 area are similar to the attribute bar corresponding to the condition box above, and the specific content thereof can refer to the description above, which will not be repeated.

In some optional embodiments, the sub-condition may be deleted. For example, the sub-condition may be deleted through a "Delete" button. Optionally, a sequence number of other sub-conditions is not affected by deleting the sub-condition.

Figure 6:
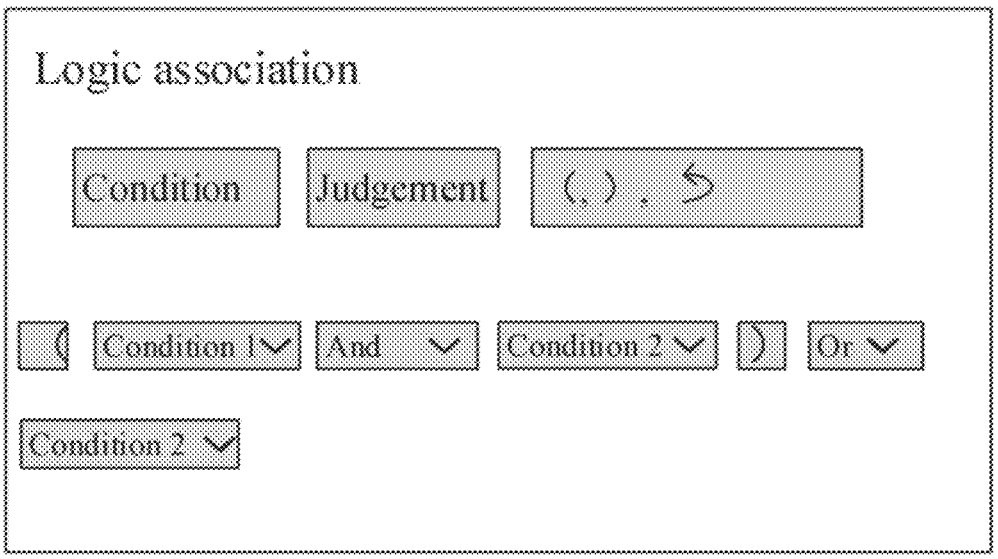
FIG. 6 is an example of a logical association between respective conditions according to an embodiment in the present disclosure.

The conditions that are already set in the combined-condition control can be associated with "or", "and", and "(",")". FIG. 6 illustrates an example of a logical association between respective conditions. For example, "Condition", "or", "and", etc., may be inputted by clicking a button, and "(",")", may be inputted by a keyboard or by a button, Once "Condition", "or", "and" are inputted into the edit box, and can be changed through the pull-down box.

Figure 7:
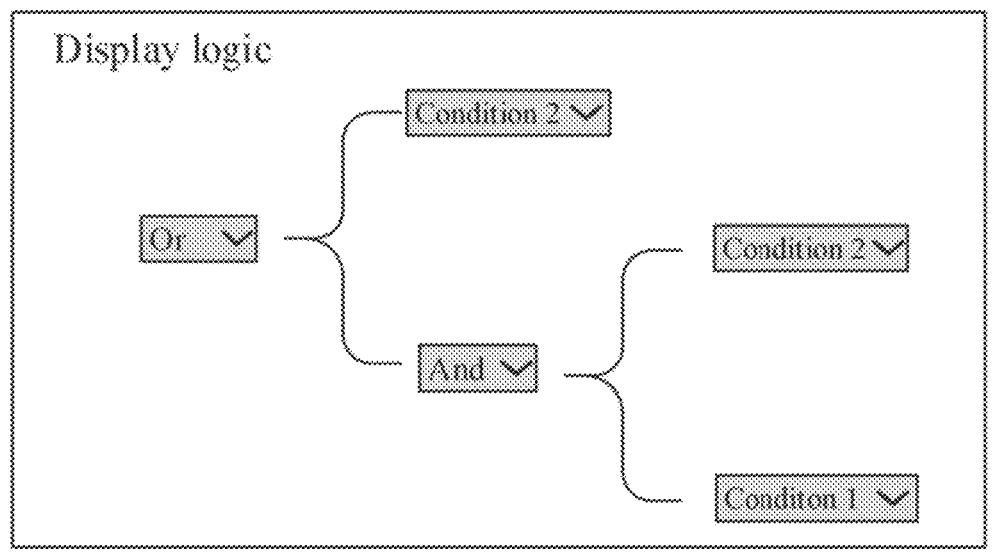
FIG. 7 is an example of a preview of a combined-condition control according to an embodiment in the present disclosure.

In some optional embodiments, for example, after the user has edited the association relation between the conditions, a binary tree may be generated by means of an in order traversal, where a leaf node may be a condition, a branch node is a logical operation symbol, and the binary tree may be displayed through a tree structure. FIG. 7 illustrates an example of a preview of a combined-condition control. The content of a logical association may be displayed in a form of a tree.

It should be noted that if the logical association has some normal conditions and some abnormal conditions, the normal conditions may be displayed at maximal allowable extent and the logical association thereof may be displayed.

As an example, under normal circumstances, a plurality of conditions and a plurality of logical words are normal, which may be calculated step by step in order. For example, "Condition A and Condition B or Condition C" is equivalent to "Condition A and Condition B" or Condition C. In the case that a plurality of conditions and a same logical word exists, the branch may be increased based on the number of the conditions, rather than increasing the number of "{" tree. Reference may be made to "{" tree structures corresponding to the two conditions and more than two conditions, the same logical word and more than two conditions, as well as different logical words in FIG. 8.

For some anomalies, for example, including a minimum particle being an empty bracket, parenthesis unpaired, condition+condition, logical word+logical word, condition+logical word, logical word+condition, etc., when only an empty bracket or parenthesis unpaired exists in the logical relation, no logic will be displayed, which means that the display is empty. If the logical association test is abnormal, the smallest particle that may be displayed in the logical relation is displayed. For example, in presence of condition+logical word, logical word+condition, "A and" or "and B" may be displayed. When only condition+condition, logical word+logical word exist in a logical association, normal logic that may be displayed at most may be displayed, such as "A B", or "and and".

For example, when the combined-condition has been finished editing, the parameter setting may be saved in the popup window and the popup window may be closed. Correspondingly, the corresponding combined-condition may be displayed in the strategy canvas.

In some optional embodiments, a logic may be tested in the process of the user editing the combined-condition control. A front-end interactive reminder may be initiated if the test indicates a problem. For example, rules for testing the logic are as follows:

For filling in the parameter, the parameter (e.g., a condition, a judgement, a value) in the condition setting must be filled with a value;

For the logical association, an association may be made between a condition and a condition with "or", "and", etc.; the brackets need to be paired and the single bracket is not allowed; the logical words "and", "or" cannot be placed continuously; there needs to be content in the "(" ")", which shall not be empty; and the single bracket can exist neither on a left side nor a right side of the logical words "or" or "and", such as "or)", "(and", etc.

In some embodiments, when the combined-condition control is selected in the strategy canvas, the main content of the attribute bar may include a name of the condition and a preview. Optionally, the contents of sub-conditions in the combined-condition may be displayed, while the specific parameters of the sub-conditions cannot be displayed. For example, the contents of the sub-conditions displayed may be "MACD is low gold cross," "Net profit>20%", "Maximum buyable>0" and so on.

Optionally, an edit entry of the combined-condition control can exist in the attribute bar, a popup window may be entered after clicking, and the combined-condition may be edited.

Figures 8, 9A, 9B:
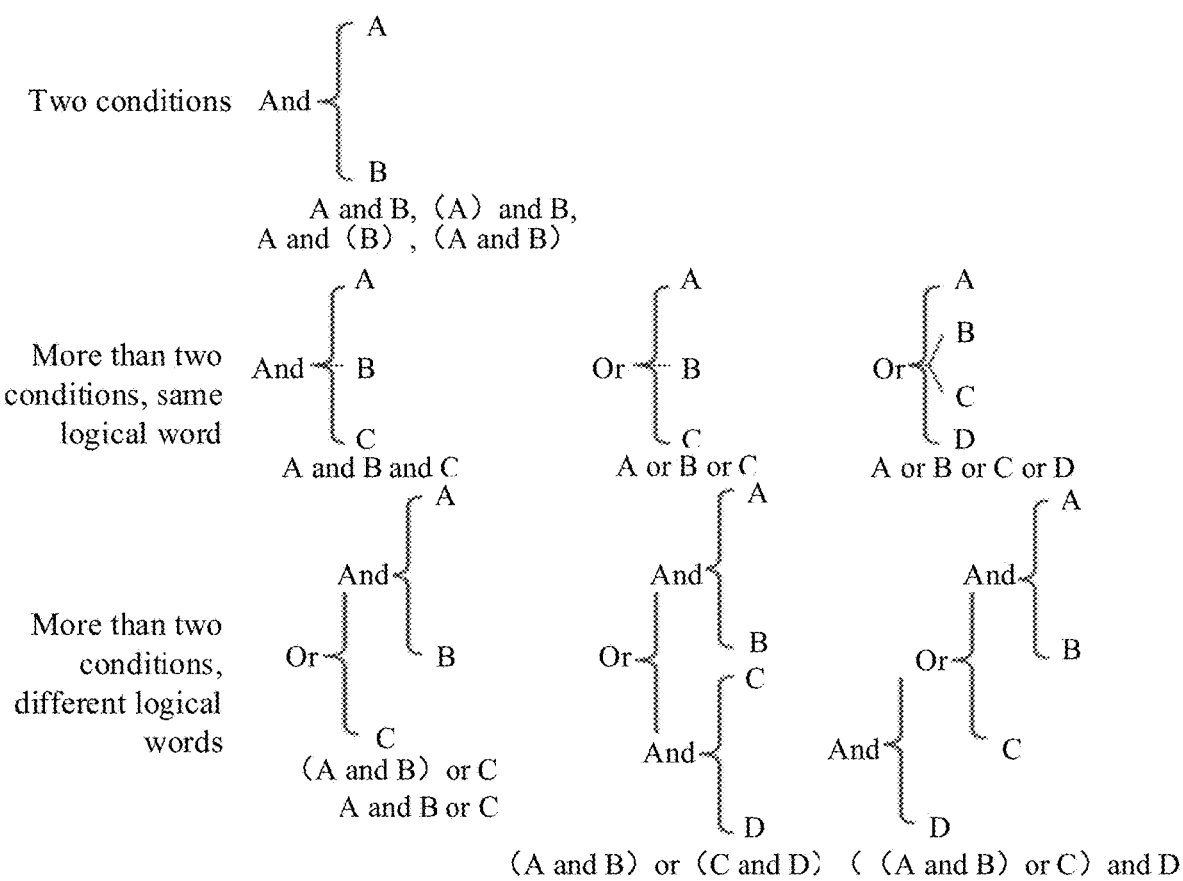
FIG. 8 is another example of a preview of a combined-condition control according to an embodiment in the present disclosure.
FIG. 9A is a specific example of an attribute bar corresponding to an event box according to an embodiment in the present disclosure, in which quantity and price support are inputted in three ways.
FIG. 9B is a specific example of an attribute bar corresponding to an event box according to an embodiment in the present disclosure, in which an event is an assignment operation and an assigned variable supports an enumeration type.

In the embodiments of the present disclosure, when the event box is selected, a parameter editing setting of the event control may be displayed in property bar 340. FIG. 9A and FIG. 9B illustrate specific examples of an attribute bar corresponding to an event box. FIG. 9A illustrates an example that an event is to place an order in FIG. 9A, where quantity and price support are inputted in three ways, i.e., inputted manually, inputted by a condition variable (e.g., a numeric condition variable), and inputted by a global variable.

FIG. 9B illustrates an example that an event is an assignment operation, an assigned variable supports an enumeration type, the user can pull down to select an assigned global variable. The global variable shown in the pull-down tab is set in the start box. If no global variable is set, the pull-down tab may be empty; the operation may include adding, subtracting, rounding, determining an absolute value, dividing, reminder operation, and so on. The number of values is related to a selected operation. The variables may be inputted in 3 ways which are same as above and will not be repeated.

For example, the event box name can be modified by the user and is available for displaying in the canvas. For example, a box may be set with a default name. For example, the boxes may be named based on a sequence of the boxes dragged into the canvas. As a specific example, the second event control dragged in the canvas may be named event 2.

In some embodiments, when parameters of the event box are edited in the attribute bar, parameter information may be displayed in the strategy canvas for the user to read. For example, the displayed information for an order event includes name, and some or all of the parameters, such as the event box 334 in FIG. 3: "Event 2 order signal target to buy 100 shares of market orders". For example, the displayed information for an assignment event includes name, and a preview of the attribute bar, such as the event box 335 in FIG. 3: "Event 1 b=1+2".

In some optional embodiments, the control (such as the start control, the condition controls, or the event control) may be abstracted into a data structure controls. Further, a serialization interface may be implemented for the control, and the entire strategy may be stored based on a control function, for example, save and read interfaces may be implemented for different types of controls, in order to realize storing information of the control. Thus, the same strategy may be used across time, across devices, to achieve cloud synchronization for the strategy.

In the embodiments of the present disclosure, the boxes corresponding to respective controls in the strategy canvas 330 may be connected by a line, for example, in series or in parallel. The start control includes a starting point of the graphical quantitative trading strategy. For example, the start control may be the starting point for the entire graphical quantitative trading strategy, i.e., a main entry point of a program corresponding to the graphical quantitative trading strategy. The condition control or the event control includes an entry and an exit. The entry is configured to place an ending point of the connection line, and the exit is configured to place a starting point of the connection line. For example, based on a required quantitative trading strategy, the user can place the two ends of the connection line at the exit and the entry of the control through the second operation.

As an example, the line may have an arrow indicating an order in which the control runs, allowing individual controls to be connected as a complete strategy flowchart.

In some optional embodiments, the start box may have a plurality of exits, the condition box supports single-in and single-out, or single-in and double-out, and the event box supports single-in and single-out, or single-in and no-out. Optionally, the box can support creating a new to the canvas, dragging in the canvas, hovering & selecting, multi-selecting, copying, cutting, pasting, deleting, etc., which is not limited herein. In some embodiments, the start box does not support deleting, copying, cutting, or pasting, etc.

In some optional embodiments, there are two types of connection lines, one with a parameter and one without a parameter. The line without the parameter includes a direction but no parameter, for example, a line behind the start control or the event control. The line with the parameter may include a direction and a parameter. For example, a connection line placed at the exit of the condition control includes a first parameter, which is configured to indicate whether the condition representing the condition control is true. That is, for the line extending from the condition box, the parameter may be "Yes" or "No", correspondingly, the line may be marked a corresponding situation, for example, the characters "Yes" or "No" may be superimposed on the line. Optionally, the parameter of the line may be modified.

As a specific example, for the line extending from the condition box, the default parameter is "Yes". Once the line is selected, the parameter of the line may be modified in the attribute bar, for example, from "Yes" to "No".

As an example, the line may extend from the right side of the box to the left side of the box; and the line may pass through the box in the canvas and placed in the front of the box. For example, the operations performed on the line include connecting, ragging, hovering & selecting, multi-selecting, deleting, cutting, copying, or pasting, and so on.

It should be noted that the test of the quantitative trading strategy in the strategy canvas may occur in the entire process of creating a strategy, for example, including a test of the overall strategy, a test in the control, a test between controls, such as checking whether data of each node conforms to the rules, checking whether the path is appropriate, etc., so as to ensure the final strategy to generate available codes.

Further, in the embodiment, the following steps may be included: determining function coefficients corresponding to the controls based on functions of respective controls; based on the function coefficients of the controls, determining an association relation between the controls; and determining, the association relation, whether two controls are allowed to be connected through a line, and reporting an error when a user connect two controls that are not allowed to be connected.

Specifically, the function coefficient corresponding to the control is determined based on the function of the control. For example, the function coefficient of the node control (start control and end control) is set to be 0.1; the function coefficient of the condition control is set to be 0.3, and the function coefficient of the event control is set to be 0.6. If the absolute difference between the functional coefficients of two controls is greater than or equal to 0.3, it is determined that these two controls are in a strong association relation. If the absolute difference between the functional coefficients of two controls is greater than or equal to 0.2 and smaller than 0.3, it is determined that these two controls are in a medium association relation. If the absolute difference between the functional coefficients of two controls is smaller than 0.2, it is determined that these two controls are in a weak association relation. When two controls are in the weak association relation, it is determined that these two controls cannot be connected, and accordingly, an error will be reported if the user connects these two controls. The above method may be used to quickly and efficiently remind the user of the error, thereby improving the efficiency of strategy generation.

Further, when determining the association relation between the controls, the following steps may be included:

Obtaining control information corresponding to the controls, where the control information includes a control type, a preset function coefficient Par_fun corresponding to the control type, a dentification parameter Par_ide indicating a function of the control, an input parameter Par_pin indicating input data type of the control, and corresponding output data Par_pun indicating output data type of the control;

determining, based on the control information, a functional coefficient difference Par_com between the controls to be:

$$\text{Par\_com} = \varepsilon \cdot (\text{Par\_fun\_i} - \text{Par\_fun\_j}) \cdot$$
$$(\text{Par\_ide\_i} - \text{Par\_ide\_j}) \cdot \frac{\text{Par\_pin\_i} - \text{Par\_pin\_j}}{\text{Par\_pun\_i} - \text{Par\_pun\_j}}$$

where $\varepsilon$ represents a control factor calculated based on the historical data of the controls; and i and j represent control identifiers corresponding to the two controls, respectively. After calculating the functional coefficient difference, the association relation between the two controls is measured based on the functional coefficient difference, to enhance the comprehensiveness and accuracy of the evaluation of the control association relation, and to improve the accuracy of connecting the controls.

At step 230, a script of the quantitative trading strategy is obtained based on the graphical quantitative trading strategy.

Specifically, when the user completes the graphical quantitative trading strategy in the strategy canvas, i.e., when the complete strategy flowchart is drawn, the graphical quantitative trading strategy may be compiled to generate the script of the quantitative trading strategy.

In some optional embodiments, at least one path may be determined based on the graphical quantitative trading strategy, where the path includes at least one first control and a connection line between the at least one first control and an adjacent control. As a possible implementation, the first control may be encapsulated as a first function. Then, the path is encapsulated as a second function based on the first function and the connection line between the at least one first control and the adjacent control, where the second function internally calls the first function of the at least one first control on the path. Then, the script of the quantitative trading strategy is obtained based on the second function, and the script of the quantitative trading strategy includes a callback function for calling the second function.

Figure 10:
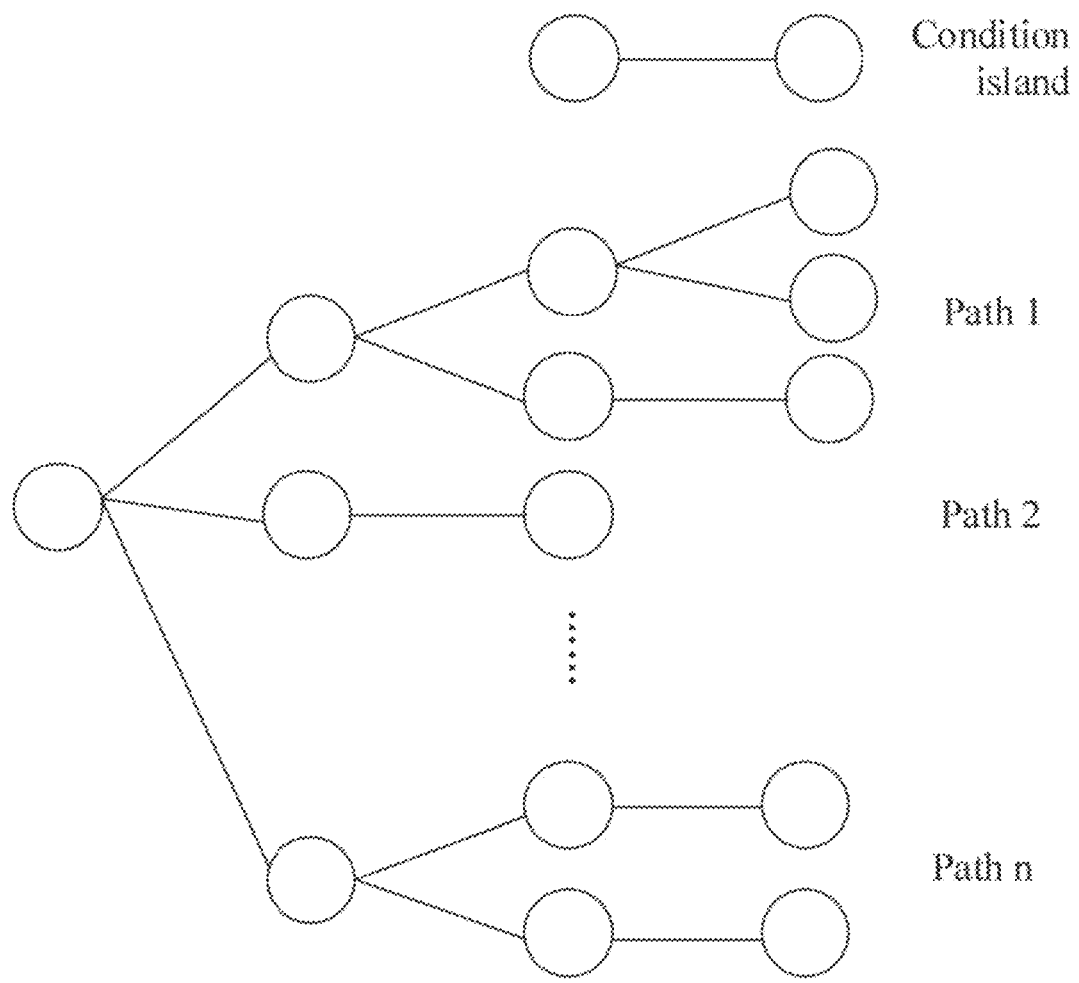
FIG. 10 is a specific example of at least one path determined based on a graphical quantitative trading strategy according to an embodiment in the present disclosure.

FIG. 10 illustrates a specific example of determining at least one path based on a graphical quantitative trading strategy. A circle can represent a control, which may be called a node. As illustrated in FIG. 10, the leftmost node represents the start control, and the other nodes are condition controls or the event controls. Each path may include at least one node (such as a node corresponding to the first control, which is, for example, a condition control or an event control) and the connection line between that node and an adjacent node.

For example, when at least one path is determined, the number of paths may be the same as the number of exits of the start control, That is, starting from the node of the start control, the connection lines between the nodes on the line can form a path. At the same time, a sequential relation of nodes in each path may be determined based on the connection lines between nodes on each path. Reference may be made to Path 1 to Path n in FIG. 10.

As illustrated in FIG. 10, when the path includes at least two first controls (i.e., nodes), the at least two first controls constitute a tree network topology. Specifically, the number of branches extending from each node on the path is not specifically limited in the present disclosure, for example, each node may be a tree with one branch or a tree with two branches.

It should be noted that some parts of the graphical quantitative trading strategy may not be included on the path, such as the two nodes corresponding to control islands illustrated in FIG. 10. The parts that are not included on the path may be not in a current operating system of the script of the strategy. For example, they may be freed from the flowchart as control islands. In addition, the control islands can exist in the strategy canvas to facilitate the user's access at any time during adjusting the strategy, instead of participating in codes compilation.

Since a loop attribute of the entire quantitative trading strategy is set in the start control, a plurality of paths may be triggered in sequence and in series each time the main callback function is triggered. For example, each path may be encapsulated as a separate path function (for example, the second function), or each control may be encapsulated as a separate control function (such as the first function). When the script of the quantitative trading strategy script is running, the main callback function can call the path function corresponding to each path, and the path function corresponding to each path can call the control function corresponding to each control.

In the embodiments of the present disclosure, at least one path constructed based on the graphical quantitative trading strategy allows the relation for calling functions to be clear and the hierarchical relation to be obvious. In this way, the automated strategy codes generation process is more controllable, and all kinds of anomaly handlings have clear boundaries.

In some optional embodiments, during the script generation based on the condition control, it is determined whether the condition is valid to select a next function to be executed and generated based on a node.

Figure 11:
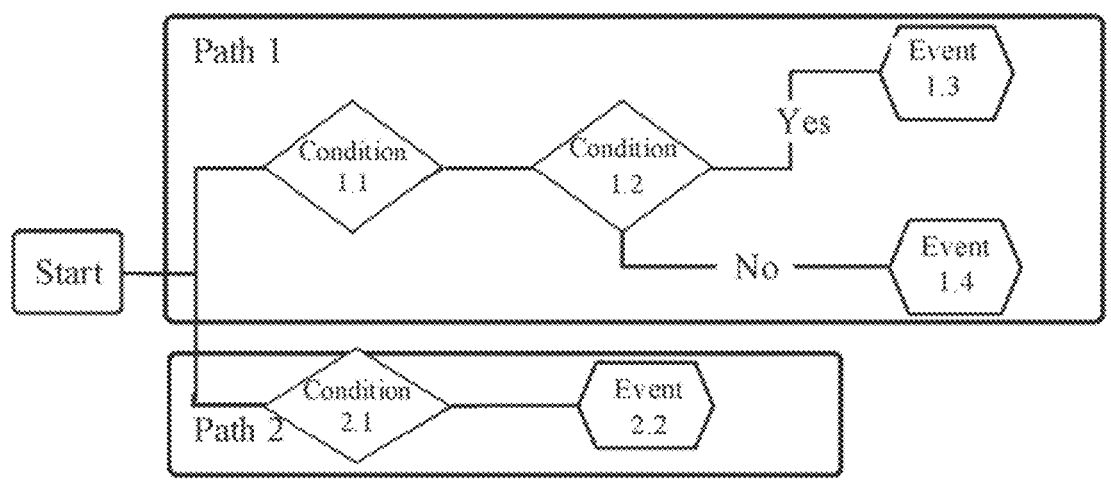
FIG. 11 is another specific example of at least one path determined based on a graphical quantitative trading strategy according to an embodiment in the present disclosure.

FIG. 11 is another specific example of at least one path determined based on a graphical quantitative trading strategy. For example, some codes for path 1 after conversion in FIG. 11 are as follows:

```
def place_order(acid, side):
    return True
global_accid=1
def action1_3( ):
    place_order(global_accid, SIDE_BUY)
def action1_4 ( ):
    place_order(global_accid, SIDE_SELL)
def do_condition1_2( ):
    return MACD( )>100
def condition1_2( ):
    if do_condition1_2( ):
        action1_3( )
    else:
        action1_4( )
def do_condition1_1( ):
    return global_accid>0
def condition1_1( ):
    if do_condition1_1( ):
        condition1_2( )
def path1( )
    condition1_1( ):
#def path2( )
    #do as path1( )
#entire framework
def framework( ):
    path1( )
    #path2( )
```

In other possible implementations, during generating the script of the strategy, each node may be generated into a method, and then the entire path can call each method step by step. Alternatively, the entire policy may be regarded as a tree structure, and based on the tree structure, corresponding codes and indentation may be generated, such that the codes in one path may be included in one method. In this way, it is avoided that many methods are generated and it is convenient for logical reading.

At step 240, a quantitative trading result can be obtained by running the script of the quantitative trading strategy.

Figure 12:
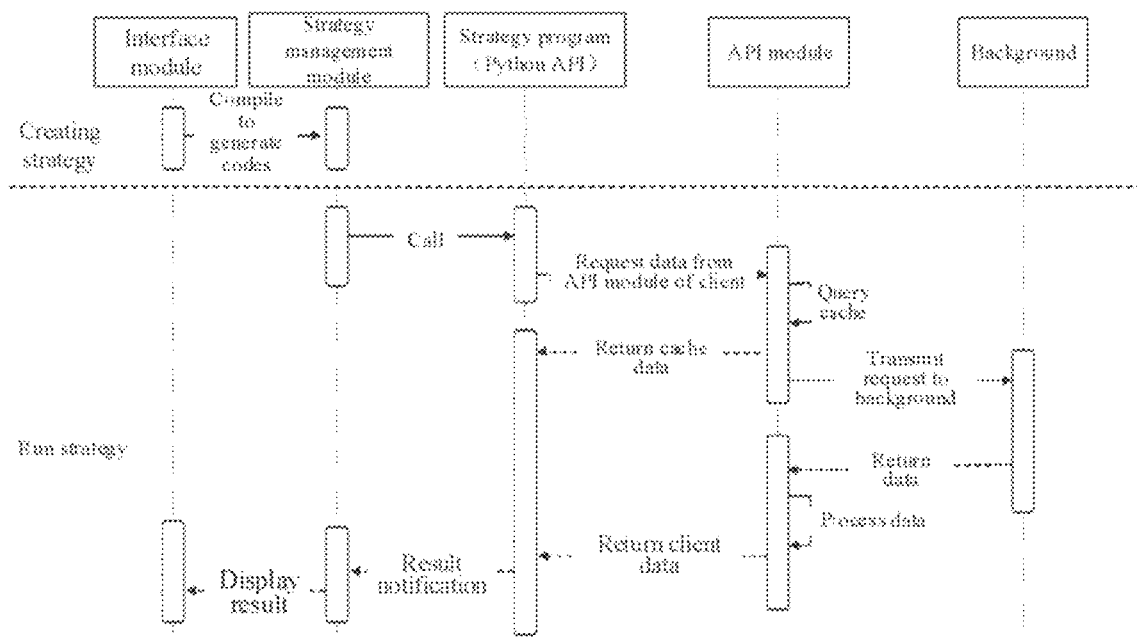
FIG. 12 is a schematic flowchart of running a script of a strategy according to an embodiment in the present disclosure.

FIG. 12 illustrates a schematic flowchart of running a script of a strategy. As illustrated in FIG. 12, when the script of the strategy is run, the strategy program can establish connection with an application programming interface (API) module of the client (such as Windows/MAC). The API module completes transmitting and receiving of individual requests and caches the data to reduce the pressure on requests in the background. The cached data may be returned directly, and other data may be requested to the background again. After the data is processed by the API module, the data can be fed back to the strategy program. For example, all market requests and transaction requests may be implemented as the architecture illustrated in FIG. 12.

For example, Python may be used as a rendering language for running the script of the strategy. Since the Python language is simple for the user and does not require a separate installation environment, the user can easily edit and directly access.

Figure 13:
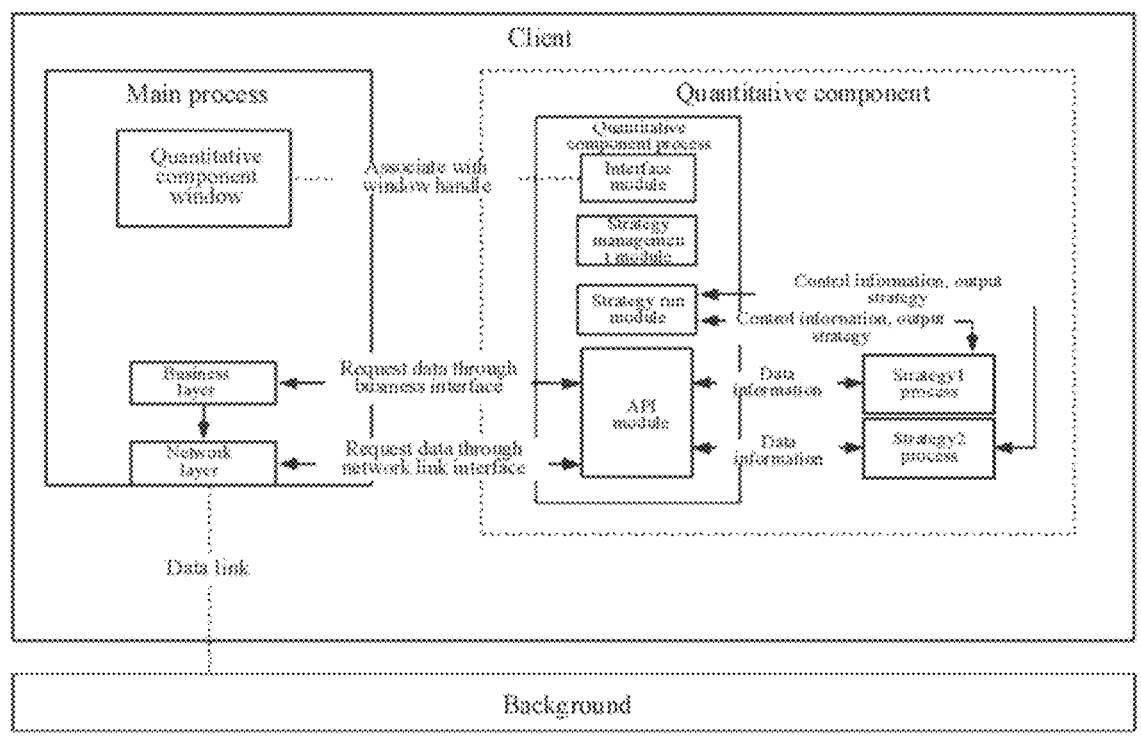
FIG. 13 is a schematic block diagram of a communication architecture for an interface response according to an embodiment in the present disclosure.

FIG. 13 illustrates a schematic block diagram of a communication architecture for an interface response according to an embodiment of the present disclosure. As illustrated in FIG. 13, in the process of running the strategy, the running of the strategy may be managed, the status of running the strategy may be viewed, and/or the result of running the strategy may be viewed in real time. For example, the result of running may include account assets, positions, orders, etc., or include tap information on the K line and preset message notifications.

As illustrated in FIG. 13, the strategy management module and the strategy program can run in separate processes. In this way, the strategy management module, as a parent process, can easily control the operation of child processes and avoid the problem that the strategy management module freezes due to the abnormality of the strategy program.

For example, socket communication may be employed for the communication between processes, for portability or extension. In addition, the socket communication allows the script program to be compatible with existing OpenD program, i.e., the script can run on the basis of the existing OpenAPI program. In addition, the embodiments of the present disclosure may adopt other approaches to achieve cross-process communication, such as pipeline, shared memory, remote procedure calls, etc., which is not limited.

Further, in the embodiments of the present disclosure, after successfully running the script of the quantitative trading strategy based on the graphical quantitative trading strategy, a name of the strategy of the graphical quantitative trading strategy may be obtained, and then the graphical quantitative trading strategy may be stored for later re-check or reuse. In addition, the embodiment includes the following steps: generating strategy control information based on a control identifier in the graphical quantitative trading strategy; storing the graphical quantitative trading strategy based on a strategy function and the strategy control information of the graphical quantitative trading strategy; and selecting a target strategy from the stored graphical quantitative trading strategy to recommend in response to obtaining a new name for a new graphical strategy.

In the embodiment, based on the control identifier in the graphical quantitative trading strategy, the strategy control information may be generated by connecting all the control identifiers in the graphical strategy to obtain the control information, so as to directly obtain the controls from the control information; and then, in response to obtaining the new name of the new graphical strategy, the corresponding target strategy may be determined by matching from the stored graphical quantitative trading strategy and the corresponding target strategy may be recommended.

Specifically, in the present embodiment, in a process of recommending a target strategy, based on a strategy name corresponding to the graphical quantitative trading strategy and a new name corresponding to a new graphical strategy, a target strategy corresponding to the new name can be determined from the graphical quantitative trading strategies by means of text matching. The specific text matching may be as follows: replacing, based on a preset text character replacement manner, the above-mentioned strategy name and new name, to obtain a strategy string Str_poi and a name string Str_nae with the same character type; and calculating a character correlation parameter Par_cor between the strategy string and the name string in accordance with:

$$\text{Par\_cor} = \alpha \cdot \frac{|\text{Str\_nae}|^2 - |\text{Str\_poi}|^2}{\log_2 \sqrt{\text{Str\_nae}^2 + \text{Str\_poi}^2}}$$

where α represents a correlation factor calculated based on historical data. In the above method, the database corresponding to the graphical quantitative trading strategy is pre-built. When the user applies it later, the user can enter a new name corresponding to a new graphical strategy to directly obtain the new graphical strategy corresponding to the new name through matching, thereby improving the application efficiency of the quantitative strategies.

Therefore, in the embodiments of the present disclosure, a graphical quantitative trading strategy, inputted by a user via a graphical interface, is obtained, the graphical quantitative trading strategy is compiled to obtain a script of a quantitative trading strategy, and the script of the strategy is run to obtain a quantitative trading result. In the present disclosure, based on various needs, the user can edit the desired graphical quantitative trading strategy via the graphical interface, without requiring the capability of writing program codes. Therefore, according to the present disclosure, a quantitative trading strategy can be achieved in a simple and flexible way to meet the user's needs.

The specific implementations of the present disclosure are described in detail in conjunction with the drawings above. However, the present disclosure is not limited to the specific details of the above embodiments. In the scope of the technical conception of the present disclosure, a plurality of simple variants of the technical solutions of the present disclosure may be made, which are within the scope of the present disclosure. For example, the specific technical characteristics described in the specific embodiments described above may be combined in any appropriate manner without contradicting with each other, and the possible combinations are not described in the present disclosure for simplicity. For example, the different implementations in the present disclosure may be arbitrarily combined, and these combinations shall be deemed to be the contents of the present disclosure as long as they do not contravene the concept of the present disclosure.

It should also be understood that in the various method embodiments of the present disclosure, the serial numbers of the above-mentioned processes does not refer to the sequence of execution, and the order of execution of each process should be determined by its function and internal logic and should not constitute any limitation to the implementation process of the embodiments of the present disclosure. It should be understood that these serial numbers are interchangeable as appropriate, and the embodiments of the present disclosure may be implemented in a sequence other than those shown or described.

The method embodiments of the present disclosure are described in detail in conjunction with FIG. 1 to FIG. 13 above, and the apparatus embodiments of the present disclosure are described in detail below in conjunction with FIG. 14 to FIG. 15.

Figure 14:
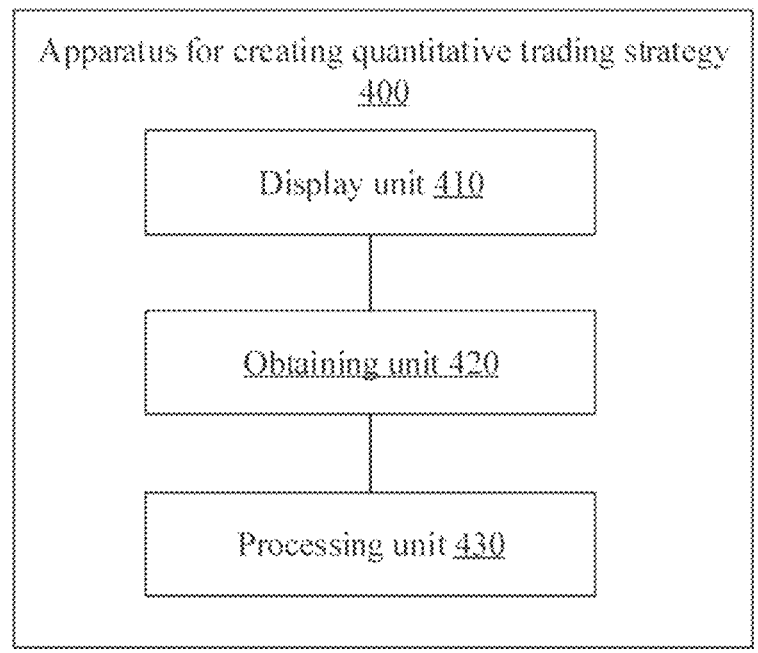
FIG. 14 is a schematic block diagram of an apparatus 400 for creating a quantitative trading strategy according to an embodiment in the present disclosure.

FIG. 14 is a schematic block diagram of apparatus 400 for creating a quantitative trading strategy according to an embodiment of the present disclosure. As illustrated in FIG. 14, the apparatus 400 may include a display unit 410, an obtaining unit 420, and a processing unit 430.

The display unit 410 is configured to display a graphical interface, which includes at least one editable control.

The obtaining unit 420 is configured to obtain a graphical quantitative trading strategy inputted by a user via the graphical interface. The graphical quantitative trading strategy includes at least two edited controls and a connection line configured to connect the at least two edited controls, and each edited control includes an attribute parameter.

The processing unit 430 is configured to obtain a script of the quantitative trading strategy based on the graphical quantitative trading strategy.

The processing unit 430 is further configured to run the script of the quantitative trading strategy to obtain a quantitative trading result.

In some optional embodiments, the graphical interface includes a control bar, a strategy canvas, and an attribute bar. The obtaining unit 420 is specifically configured to: obtain at least one control selected by the user in the control bar; add the at least one control to the strategy canvas in response to a first operation of the user, where a start control is pre-set in the strategy canvas; obtain a control selected by the user in the strategy canvas and edit, in the attribute bar, an attribute parameters of the selected control; and connect the at least one control and the start control through the connection line in response to a second operation of the user, to generate the graphical quantitative trading strategy.

In some optional embodiments, the control bar includes a condition control and/or an event control.

In some optional embodiments, the condition control includes a combined-condition control. The display unit 410 is configured to display a popup window in response to a third operation of the user. The obtaining unit 420 includes: obtaining at least two conditions and an association relation between the at least two conditions that are inputted by the user in the popup window. The processing unit 430 is further configured to generate the combined-condition control based on at least two conditions and the association relation.

In some optional embodiments, the processing unit 430 is further configured to: generate a binary tree by means of an in order traversal, where leaf nodes of the binary tree represent the at least two conditions; and a branch node of the binary tree represents the association relation between the at least two conditions.

The display unit 410 is further configured to display a preview of the combined-condition control. The preview of the combined-condition control includes the binary tree.

An attribute setting of the start control includes at least one of an applicable account setting, a loop setting, and a global variable setting.

In some optional embodiments, the processing unit 430 is specifically configured to: determine at least one path based on the graphical quantitative trading strategy, where the path includes at least one first control and a connection line between the at least one first control and an adjacent control; encapsulate the at least one first control as a first function; encapsulate the path as a second function based on the first function and the connection line between the at least one first control and the adjacent control, where the second function internally calls the first function of the at least one first control on the path; and obtain the script of the quantitative trading strategy based on the second function, where the script of the quantitative trading strategy includes a callback function for calling the second function.

In some optional embodiments, the path includes at least two first controls, and the at least two first controls form a tree network topology.

In some optional embodiments, the graphical quantitative trading strategy includes a start control, where the number of at least one path is determined based on the number of exits of the start control.

It should be understood that the apparatus embodiments correspond to the method embodiments, and the descriptions of the apparatus embodiments can refer to that of the method embodiments, which will not be repeated herein for simplicity. Specifically, in the embodiments, the apparatus 400 may correspond to an object for implementing the method 200 according to the embodiments of the present disclosure. The aforementioned and other operations and/or functions of each module in the apparatus 400 are respectively for implementing the corresponding processes in respective methods in FIG. 2, which is not repeated herein for simplicity.

The apparatus and system of the embodiments of the present disclosure are described from the point of view of the function modules in conjunction with the drawings above. It should be understood that the function module may be implemented in the form of hardware, instructions in the form of software, or through a combination of hardware and software modules. Specifically, the steps of the method embodiment in the present disclosure may be completed by means of integrated logic circuits of the hardware in the processor and/or instructions in the form of software, and the steps of the method embodiments of the present disclosure may be directly completed by the hardware decoding processor, or the combination of hardware and software modules in the decoding processor. Optionally, software modules may be located in a random memory, a flash memory, a read-only memory, a programmable read-only memory, an electrically erasable programmable memory, a register and other mature storage medium in the field. The storage medium is located in the memory, and the processor reads the information in the memory and completes the steps in the method embodiments above in conjunction with its hardware.

Figure 15:
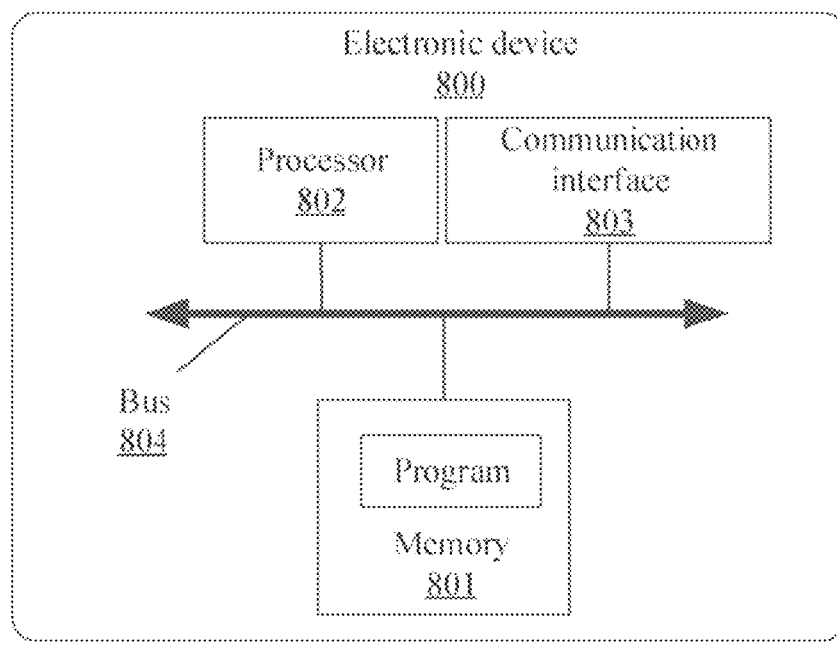
FIG. 15 is a schematic block diagram of an electronic device 800 according to an embodiment in the present disclosure.

FIG. 15 is a schematic block diagram of an electronic device 800 according to an embodiment of the present disclosure.

As illustrated in FIG. 15, the electronic device 800 may include a memory 810, and a processor 820 configured to store a computer program and transmit program codes to the processor 820. In other words, the processor 820 can call and run the computer program from the memory 810 to implement the method according to the embodiments of the present disclosure.

For example, the processor 820 may be configured to implement the steps in the method 200 above in accordance with instructions in the computer program.

In some embodiments of the present disclosure, the processor 820 may include, but is not limited to, a universal processor, a digital signal processor (DSP), an application specific integrated circuit (ASIC), a field programmable gate array (FPGA) or other programmable logic devices, discrete doors or transistor logic devices, discrete hardware components, and so on.

In some embodiments of the present disclosure, the memory 810 includes, but is not limited to, a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), which is used as an external cache. Many forms of RAM are available, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synch link dynamic random-access memory (SLDRAM), and a direct ramus random-access memory (DR RAM), which are illustrative and not limited in the present disclosure.

In some embodiments of the present disclosure, the computer program may be divided into one or more modules. The one or more modules may be stored in the memory 810 and executed by the processor 820, in order to complete the coding method according to the present disclosure. The one or more modules may be a series of computer program instruction segments capable of implementing a specific function, and the instruction segments are configured to describe the implementation process of the computer program in the electronic device 800.

Optionally, as illustrated in FIG. 8, the electronic device 800 may further include: a transceiver 830 connected to the processor 820 or memory 810.

The processor 820 can control the transceiver 830 to communicate with other devices, specifically, to transmit information or data to other devices, or to receive information or data transmitted by other devices. The transceiver 830 may include a transmitter and a receiver. The transceiver

830 can further include an antenna, and the number of antennas may be one or more.

It should be understood that the components of the electronic device 800 are connected by a bus system that includes a power bus, a control bus, and a status signal bus in addition to a data bus.

According to one aspect of the present disclosure, a communication apparatus is provided. The communication apparatus includes a processor and a memory configured to store a computer program, and the processor is configured to invoke and run a computer program stored in the memory to cause the encoder to implement the method of the above method embodiments.

According to one aspect of the present disclosure, a computer storage medium is provided. The computer storage medium has a computer program stored thereon, and the computer program is executed by the computer to cause the computer to implement the method of the above method embodiments. In other words, the embodiment of the present disclosure provides a computer program product containing instructions, and the instructions, when executed by the computer, cause the computer to implement the above method embodiments.

According to another aspect of the present disclosure, a computer program product or a computer program is provided. The computer program product or the computer program includes computer instructions stored on a computer-readable storage medium. A processor of a computer device reads the computer instructions from the computer-readable storage medium, and the processor executes the computer instructions to cause the computer device to implement the method of the above method embodiments.

In other words, when the embodiments are implemented by using software, they may be implemented in whole or in part in the form of computer program products. The computer program product includes one or more computer instructions. When the computer program instructions are loaded and executed in a computer, all or part of the process or function according to an embodiment of the present disclosure is generated. The computer may be a general purpose computer, an application specific computer, a computer network, or other programmable apparatus. The computer instructions may be stored on a computer-readable storage medium, or transferred from a computer-readable storage medium to another computer-readable storage media, for example, from a web site, a computer, a server, or a data center to another web site, computer, server or data center through a wire (such as a coaxial cable, an optical fiber, a digital subscriber line (DSL)) or wireless (such as infrared, wireless, microwave, and so on) way. The computer-readable storage medium may be any available medium that the computer can access or data storage devices such as servers, data centers, and so on that include one or more integrated available media. The available medium may be a magnetic medium (e.g., floppy disks, hard drives, tapes), an optical medium (e.g., a digital video disc (DVD)), or a semiconductor medium (e.g., a solid state disk (SSD)), etc.

Those skilled in the art may realize that the modules and algorithm steps of the examples described in conjunction with the embodiments described herein may be realized by electronic hardware, or a combination of computer software and electronic hardware. Whether these functions are implemented in hardware or software depends on the specific application and design constraints of the technical solutions. Professional technicians can use different methods for each particular application to implement the described functions, but this implementation should not be considered beyond the scope of the present disclosure.

In the several embodiments provided in the present disclosure, it should be understood that the described device, apparatus and method may be implemented in other ways. For example, the apparatus embodiments described above are merely indicative, for example, the division of the modules is only a logical function division, and the actual implementation may have another division way, such as a plurality of modules or components may be combined or may be integrated into another system, or some characteristics may be ignored or not implemented. The coupling or direct coupling or communication connections illustrated or discussed may be indirect coupling or communication connections through some interfaces, apparatuses or modules, and may be electrical, mechanical or otherwise.

Modules described as separate parts can or may not be physically separated, and components displayed as modules may be or may not be physical modules, i.e., they may be located in one place or distributed across a plurality of network units. Some or all of these modules may be selected according to actual needs to achieve the purpose of the solutions of the embodiments. For example, respective function modules in respective embodiments of the present disclosure may be integrated in one processing module, or each module can exist physically alone, or two or more modules may be integrated in one module.

The above is only the specific embodiments of the present disclosure, and the scope of the present disclosure is not limited to this. Any changes or replacements easily thought of by any skilled person in the art in the technical scope of the present disclosure should be covered by the scope of the present disclosure. Therefore, the scope of the present disclosure shall be subject to the scope of the claim.

What is claimed is:

1. A method for creating a quantitative trading strategy, comprising:

displaying a graphical interface, wherein the graphical interface comprises at least two editable controls, the at least two editable controls comprise an account control, and the account control is divided based on a status of a trading business account of a user;

determining function coefficients corresponding to the at least two editable controls based on functions of the at least two editable controls;

determining an association relation between two controls among the at least two editable controls based on the function coefficients of the at least two editable controls;

determining, based on the association relation, whether the two controls are allowed to be connected through a line, and reporting an error when the user connects the two controls that are not allowed to be connected;

obtaining a graphical quantitative trading strategy inputted by a user via the graphical interface, wherein the graphical quantitative trading strategy comprises at least two edited controls and a connection line configured to connect the at least two edited controls, and each of the at least two edited controls comprises an attribute parameter;

obtaining a script of the quantitative trading strategy based on the graphical quantitative trading strategy;

running the script of the quantitative trading strategy to obtain a quantitative trading result;

generating strategy control information based on a control identifier in the graphical quantitative trading strategy;

storing the graphical quantitative trading strategy based on a strategy function and the strategy control information of the graphical quantitative trading strategy; and selecting a target strategy from the stored graphical quantitative trading strategy to recommend in response to obtaining a new name for a new graphical strategy, wherein each editable control is abstracted into a data structure control, a serialization interface is implemented for the editable control, the entire strategy is stored based on a control function, save and read interfaces are implemented for different types of editable controls, in order to realize storing information of the editable control, and the same strategy is used across time, across devices, to achieve cloud synchronization for the strategy, wherein a control in a control bar is added to a strategy canvas by clicking and holding down a left mouse button and/or dragging a combined-control button, when a mouse hovers over the control in the control bar, the control floats and is draggable, a color of the canvas changes accordingly to prompt the user with a possible area where the control can be placed, and when the control is dragged fully into an area of the canvas, the control switches from a style in the original control bar to a style in the canvas, indicating that the control is in a placeable status, wherein an attribute bar is configured to edit an attribute for the control, and the attribute is edited in the attribute bar, wherein each graphical quantitative trading strategy has a start control, and the start control is generated by default when the strategy is created, wherein said obtaining the script of the quantitative trading strategy based on the graphical quantitative trading strategy comprises:

determining at least one path based on the graphical quantitative trading strategy, wherein the path comprises at least one first control and a connection line between the at least one first control and an adjacent control;

encapsulating the at least one first control as a first function;

encapsulating the path as a second function based on the first function and the connection line between the at least one first control and the adjacent control, wherein the second function internally calls the first function of the at least one first control on the path; and obtaining the script of the quantitative trading strategy based on the second function, wherein the script of the quantitative trading strategy comprises a callback function for calling the second function, wherein the path comprises at least two first controls, and the at least two first controls form a tree network topology.

2. The method according to claim 1, wherein the graphical interface comprises a control bar, a strategy canvas, and an attribute bar, and wherein said obtaining the graphical quantitative trading strategy inputted by the user via the graphical interface comprises:

obtaining at least one control selected by the user in the control bar;

adding the at least one control to the strategy canvas in response to a first operation of the user, wherein a start control is pre-set in the strategy canvas;

obtaining a control selected by the user in the strategy canvas, and editing, in the attribute bar, an attribute parameter of the selected control; and connecting the at least one control and the start control through the connection line in response to a second operation of the user, to generate the graphical quantitative trading strategy.

3. The method according to claim 2, wherein the control bar comprises a condition control and/or an event control.

4. The method according to claim 3, wherein the condition control comprises a combined condition control, and the method further comprises:

displaying a popup window in response to a third operation of the user;

obtaining at least two conditions and an association relation between the at least two conditions that are inputted by the user in the popup window; and generating the combined condition control based on the at least two conditions and the association relation.

5. The method according to claim 4, further comprising:

generating a binary tree, wherein leaf nodes of the binary tree represent the at least two conditions, and a branch node of the binary tree represents the association relation between the at least two conditions; and displaying a preview of the combined condition control, wherein the preview comprises the binary tree.

6. The method according to claim 2, wherein an attribute setting of the start control comprises at least one of an applicable account setting, a loop setting, and a global variable setting.

7. The method according to claim 1, wherein the graphical quantitative trading strategy comprises a start control, wherein the number of the at least one path is determined based on the number of exits of the start control.

8. An electronic device, comprising a processor, and a memory having instructions stored thereon, wherein the instructions, when executed by the processor, cause the processor to implement a method for creating a quantitative trading strategy, the method comprising:

displaying a graphical interface, wherein the graphical interface comprises at least two editable controls, the at least two editable controls comprise an account control, and the account control is divided based on a status of a trading business account of a user;

determining function coefficients corresponding to the at least two editable controls based on functions of the at least two editable controls;

determining an association relation between two controls among the at least two editable controls based on the function coefficients of the at least two editable controls;

determining, based on the association relation, whether the two controls are allowed to be connected through a line, and report an error when the user connects the two controls that are not allowed to be connected;

obtaining a graphical quantitative trading strategy inputted by a user via the graphical interface, wherein the graphical quantitative trading strategy comprises at least two edited controls and a connection line configured to connect the at least two edited controls, and each of the at least two edited controls comprise an attribute parameter;

obtaining a script of the quantitative trading strategy based on the graphical quantitative trading strategy;

running the script of the quantitative trading strategy to obtain a quantitative trading result;

generating strategy control information based on a control identifier in the graphical quantitative trading strategy;

storing the graphical quantitative trading strategy based on a strategy function and the strategy control information of the graphical quantitative trading strategy; and selecting a target strategy from the stored graphical quantitative trading strategy to recommend in response to obtaining a new name for a new graphical strategy, wherein each editable control is abstracted into a data structure control, a serialization interface is implemented for the editable control, the entire strategy is stored based on a control function, save and read interfaces are implemented for different types of editable controls, in order to realize storing information of the editable control, and the same strategy is used across time, across devices, to achieve cloud synchronization for the strategy, wherein a control in a control bar is added to a strategy canvas by clicking and holding down a left mouse button and/or dragging a combined-control button, when a mouse hovers over the control in the control bar, the control floats and is draggable, a color of the canvas changes accordingly to prompt the user with a possible area where the control can be placed, and when the control is dragged fully into an area of the canvas, the control switches from a style in the original control bar to a style in the canvas, indicating that the control is in a placeable status, wherein an attribute bar is configured to edit an attribute for the control, and the attribute is edited in the attribute bar, wherein each graphical quantitative trading strategy has a start control, and the start control is generated by default when the strategy is created, wherein said obtaining the script of the quantitative trading strategy based on the graphical quantitative trading strategy comprises:

determining at least one path based on the graphical quantitative trading strategy, wherein the path comprises at least one first control and a connection line between the at least one first control and an adjacent control;

encapsulating the at least one first control as a first function;

encapsulating the path as a second function based on the first function and the connection line between the at least one first control and the adjacent control, wherein the second function internally calls the first function of the at least one first control on the path; and obtaining the script of the quantitative trading strategy based on the second function, wherein the script of the quantitative trading strategy comprises a callback function for calling the second function, wherein the path comprises at least two first controls, and the at least two first controls form a tree network topology.

9. The electronic device according to claim 8, wherein the graphical interface comprises a control bar, a strategy canvas, and an attribute bar, and wherein said obtaining the graphical quantitative trading strategy inputted by the user via the graphical interface comprises:

obtaining at least one control selected by the user in the control bar;

adding the at least one control to the strategy canvas in response to a first operation of the user, wherein a start control is pre-set in the strategy canvas;

obtaining a control selected by the user in the strategy canvas, and editing, in the attribute bar, an attribute parameter of the selected control; and connecting the at least one control and the start control through the connection line in response to a second operation of the user, to generate the graphical quantitative trading strategy.

10. The electronic device according to claim 9, wherein the control bar comprises a condition control and/or an event control.

11. The electronic device according to claim 10, wherein the condition control comprises a combined condition control, and the method further comprises:

displaying a popup window in response to a third operation of the user;

obtaining at least two conditions and an association relation between the at least two conditions that are inputted by the user in the popup window; and generating the combined condition control based on the at least two conditions and the association relation.

12. The electronic device according to claim 11, further comprising:

generating a binary tree, wherein leaf nodes of the binary tree represent the at least two conditions, and a branch node of the binary tree represents the association relation between the at least two conditions; and displaying a preview of the combined condition control, wherein the preview comprises the binary tree.

13. The electronic device according to claim 9, wherein an attribute setting of the start control comprises at least one of an applicable account setting, a loop setting, and a global variable setting.

14. The electronic device according to claim 8, wherein the graphical quantitative trading strategy comprises a start control, wherein the number of the at least one path is determined based on the number of exits of the start control.

15. A non-transitory computer-readable storage medium, having a computer program stored thereon, wherein the computer program causes a computer to implement the method according to claim 1.

* * * * *